United States Patent
Hu et al.

(10) Patent No.: US 11,887,384 B2
(45) Date of Patent: Jan. 30, 2024

(54) IN-CABIN OCCUPANT BEHAVOIR DESCRIPTION

(71) Applicant: Black Sesame International Holding Limited, Santa Clara, CA (US)

(72) Inventors: Zilong Hu, San Jose, CA (US); Lei Zhang, Campbell, CA (US); Qun Gu, San Jose, CA (US)

(73) Assignee: Black Sesame Technologies Inc., San Jose, CA (US)

(*) Notice: Subject to any disclaimer, the term of this patent is extended or adjusted under 35 U.S.C. 154(b) by 10 days.

(21) Appl. No.: 17/164,954

(22) Filed: Feb. 2, 2021

(65) Prior Publication Data

US 2022/0245388 A1 Aug. 4, 2022

(51) Int. Cl.
*G06V 20/59* (2022.01)
*G06T 7/70* (2017.01)
(Continued)

(52) U.S. Cl.
CPC ........... *G06V 20/59* (2022.01); *G06T 7/70* (2017.01); *G06V 10/40* (2022.01); *G06V 20/41* (2022.01);
(Continued)

(58) Field of Classification Search
CPC ........ G06V 20/59; G06V 10/40; G06V 20/41; G06V 20/47; G06V 40/20; G06T 7/70;
(Continued)

(56) References Cited

U.S. PATENT DOCUMENTS

| 11,193,312 B1 * | 12/2021 | Weng | B60R 25/01 |
| 2016/0249191 A1 * | 8/2016 | Avrahami | H04L 67/12 |

(Continued)

FOREIGN PATENT DOCUMENTS

| CN | 110046537 A | 7/2019 |
| CN | 110072142 A | 7/2019 |

(Continued)

OTHER PUBLICATIONS

Buch, Shyamal, Victor Escorcia, Chuanqi Shen, Bernard Ghanem, and Juan Carlos Niebles. "Sst: Single-stream temporal action proposals." In Proceedings of the IEEE conference on Computer Vision and Pattern Recognition, pp. 2911-2920. 2017.

(Continued)

*Primary Examiner* — Amara Abdi
(74) *Attorney, Agent, or Firm* — Timothy T. Wang; Ni, Wang & Massand, PLLC

(57) ABSTRACT

A method of describing a temporal event, including receiving a video sequence of the temporal event, extracting at least one physical characteristic of an at least one occupant within the video sequence, extracting at least one action of the at least one occupant within the video sequence, extracting at least one interaction of the at least one occupant with a secondary occupant within the video sequence, determining a safety level of the temporal event within a vehicle based on at least one of the at least one action and the at least one interaction and describing the at least one physical characteristic of the at least one occupant and at least one of the at least one action and the at least one interaction of the at least one occupant.

18 Claims, 6 Drawing Sheets

(51) Int. Cl.
  *G06V 10/40* (2022.01)
  *G06V 20/40* (2022.01)
  *G06V 40/20* (2022.01)
  *B60Q 9/00* (2006.01)
(52) U.S. Cl.
  CPC .............. *G06V 20/47* (2022.01); *G06V 40/20* (2022.01); *B60Q 9/00* (2013.01); *G06T 2207/10016* (2013.01); *G06T 2207/30196* (2013.01); *G06T 2207/30268* (2013.01)
(58) Field of Classification Search
  CPC . G06T 2207/10016; G06T 2207/30196; G06T 2207/30268; B60Q 9/00
  See application file for complete search history.

(56) References Cited

U.S. PATENT DOCUMENTS

| | | | | |
|---|---|---|---|---|
| 2017/0124831 | A1* | 5/2017 | Li | G08B 21/02 |
| 2017/0351922 | A1* | 12/2017 | Campbell | G06V 20/40 |
| 2018/0074501 | A1 | 3/2018 | Boniske et al. | |
| 2018/0157902 | A1* | 6/2018 | Tu | A61B 5/742 |
| 2018/0251122 | A1* | 9/2018 | Golston | B60W 50/0098 |
| 2019/0095706 | A1* | 3/2019 | Fujimoto | G06F 18/2321 |
| 2019/0197430 | A1* | 6/2019 | Arditi | G06N 20/00 |
| 2020/0089961 | A1* | 3/2020 | Cho | A61B 5/167 |
| 2020/0166929 | A1* | 5/2020 | Jiwani | G05D 1/0022 |
| 2020/0207358 | A1 | 7/2020 | Katz et al. | |
| 2020/0269848 | A1 | 8/2020 | Kang et al. | |
| 2020/0298801 | A1 | 9/2020 | Dingli | |
| 2021/0402942 | A1* | 12/2021 | Torabi | B60W 50/14 |
| 2023/0053618 | A1* | 2/2023 | Luc | G06T 11/00 |

FOREIGN PATENT DOCUMENTS

| | | |
|---|---|---|
| CN | 110341594 A | 10/2019 |
| CN | 110929092 A | 3/2020 |
| CN | 111368656 A | 7/2020 |
| CN | 111833861 A | 10/2020 |

OTHER PUBLICATIONS

Jingwen Wang, Wenhao Jiang, Lin Ma, Wei Liu, and Yong Xu. "Bidirectional attentive fusion with context gating for dense video captioning." In Proceedings of the IEEE Conference on Computer Vision and Pattern Recognition, pp. 7190-7198. 2018.

* cited by examiner

IN-CABIN OCCUPANT BEHAVOIR DESCRIPTION

BACKGROUND

Technical Field

The instant disclosure is related to behavior description and more specifically to in-cabin occupant behavior description.

Background

Currently, methods to describe in-cabin behaviors such as driver monitoring systems (DMS) and occupant monitoring systems (OMS) apply a convolutional neural network to extract features and summarize spatial information within a single frame by squeezing the extracted convolutional 3D features into 1-dimensional feature vectors through global pooling, thus degrading spatial information, and losing temporal information altogether.

Additionally, current methods generate a single description about a video sequence. This single description prevents precisely pinpointing an action performed by an occupant if there are multiple occupants within the video sequence.

Currently, convolutional neural networks applied to driver monitoring systems (DMS) and occupant monitoring systems (OMS) are primarily utilized to generate an intermediate result, such as facial location, head pose, eye closure, mouth openness, etc. In order to determine a safety level of an event, those intermediate results are further processed, usually through a rule-based methodology, to generate a final result.

SUMMARY

An example method of describing a temporal event, including receiving a video sequence of the temporal event, extracting at least one physical characteristic of at least one occupant within the video sequence, extracting at least one action of the at least one occupant within the video sequence, extracting at least one interaction of the at least one occupant with a secondary occupant within the video sequence, determining a safety level of the temporal event within a vehicle based on at least one of the at least one action and the at least one interaction and describing the at least one physical characteristic of the at least one occupant and at least one of the at least one action and the at least one interaction of the at least one occupant.

Another example method of describing a temporal event, including receiving a video sequence of the temporal event, extracting at least one spatial characteristic of an at least one occupant within the video sequence, extracting at least one temporal action of the at least one occupant within the video sequence, extracting at least one temporal interaction of the at least one occupant, with a secondary occupant within the video sequence, determining a safety level of the temporal event within a vehicle based on at least one of the at least one temporal action and the at least one temporal interaction of the at least one occupant and describing the at least one physical characteristic of the at least one occupant and at least one of the at least one temporal action and the at least one temporal interaction of the at least one occupant.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to. . . . " Also, the term "couple" or "couples" is intended to mean either an indirect or direct connection. Thus, if a first device couples to a second device that connection may be through a direct connection or through an indirect connection via other devices and connections.

Figure 1:
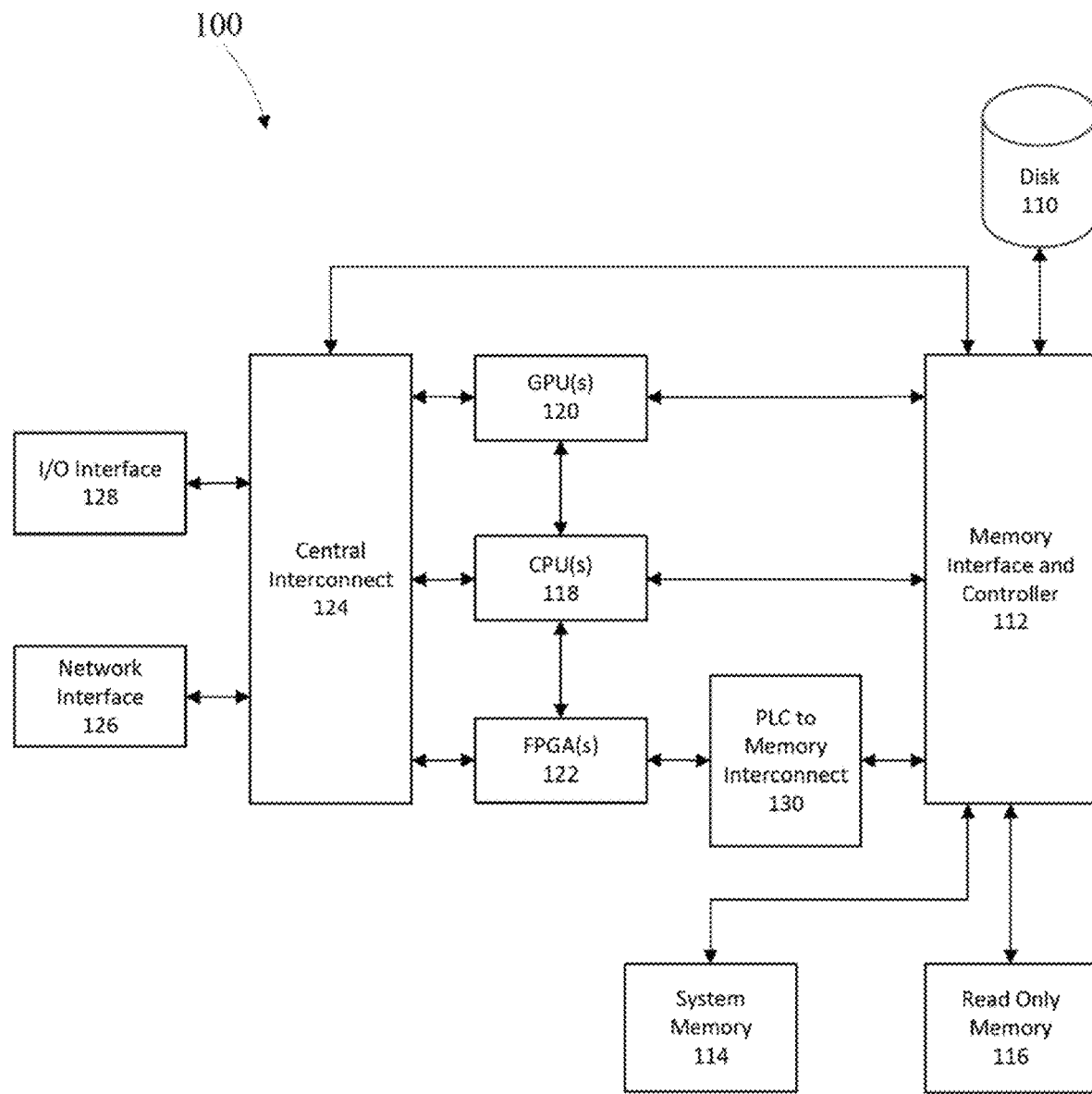
FIG. 1 is a first example system diagram in accordance with one embodiment of the disclosure.
Figure 5:
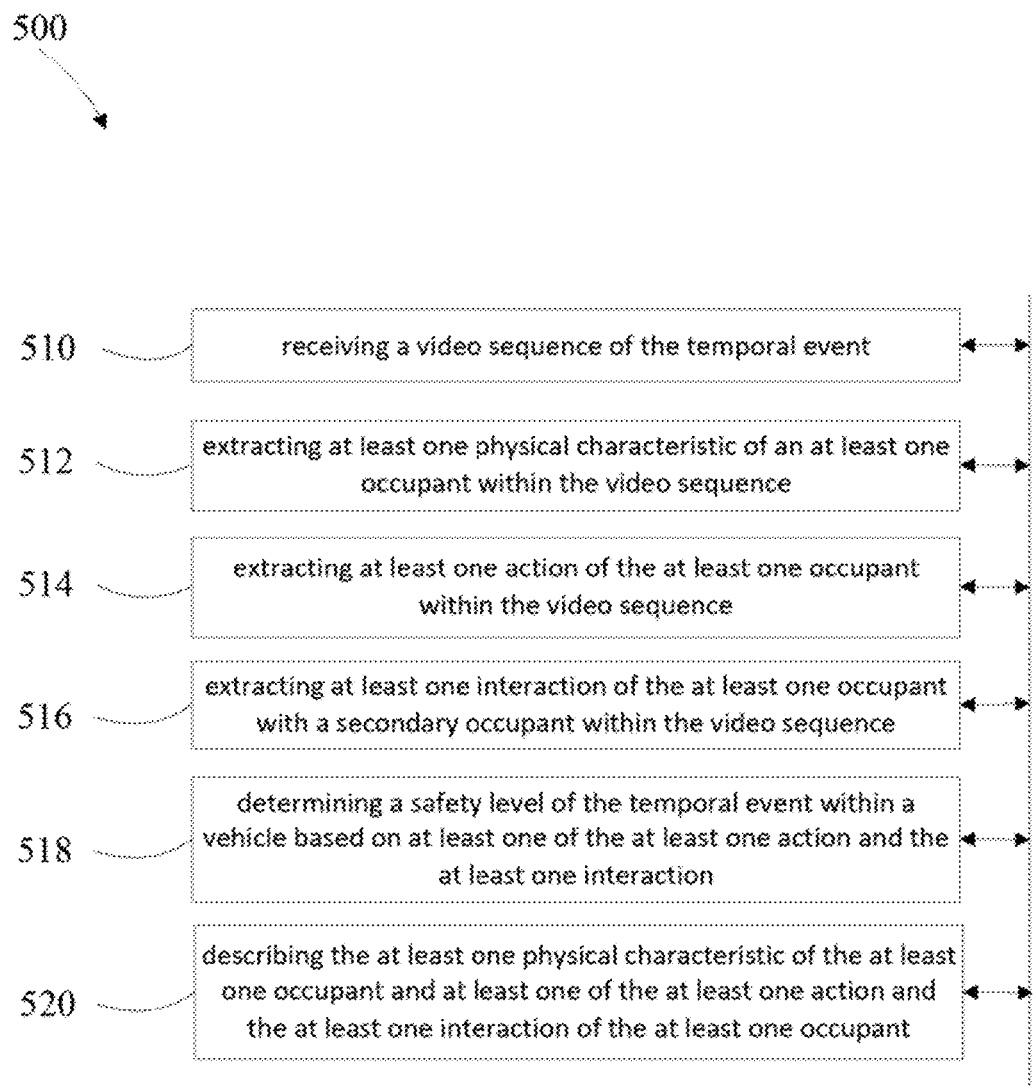
FIG. 5 is a first example method in accordance with one embodiment of the disclosure.
Figure 6:
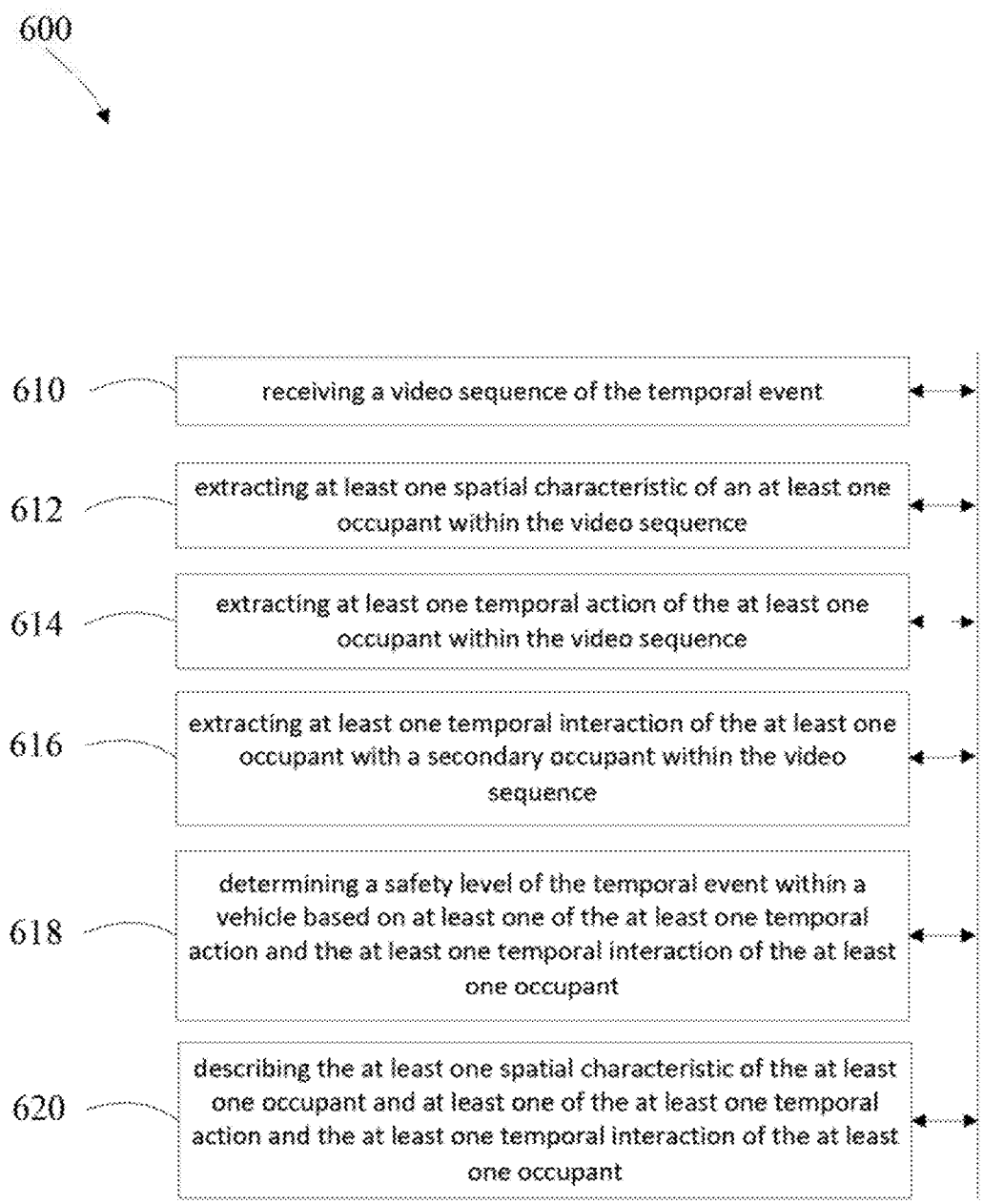
FIG. 6 is a second example method in accordance with one embodiment of the disclosure.

FIG. 1 depicts an example hybrid computational system 100 that may be used to implement neural nets associated with the operation of one or more portions or steps of the processes depicted in FIGS. 5-6. In this example, the processors associated with the hybrid system comprise a field programmable gate array (FPGA) 122, a graphical processor unit (GPU) 120 and a central processing unit (CPU) 118.

The CPU 118, GPU 120 and FPGA 122 have the capability of providing a neural net. A CPU is a general processor that may perform many different functions, its generality leads to the ability to perform multiple different tasks, however, its processing of multiple streams of data is limited and its function with respect to neural networks is limited. A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are designed for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120, central processing unit 118 and field programmable gate arrays 122 are connected and are connected to a memory interface controller 112. The FPGA is connected to the memory interface through a programmable logic circuit to memory interconnect 130. This additional device is utilized due to the filet that the FPGA is operating with a very large bandwidth and to minimize the circuitry utilized from the FPGA to perform memory tasks. The memory and interlace controller 112 is additionally connected to persistent memory disk 110, system memory 114 and read only memory (ROM) 116.

The system of FIG. 1A may be utilized for programming and training the FPGA. The GPU functions well with unstructured data and may be utilized for training, once the data has been trained a deterministic inference model may be found and the CPU may program the FPGA with the model data determined by the GPU.

The memory interface and controller is connected to a central interconnect 124, the central interconnect is additionally connected to the GPU 120, CPU 118 and FPGA 122. The central interconnect 124 is additionally connected to the input and output interface 128 and the network interface 126.

Figure 2:
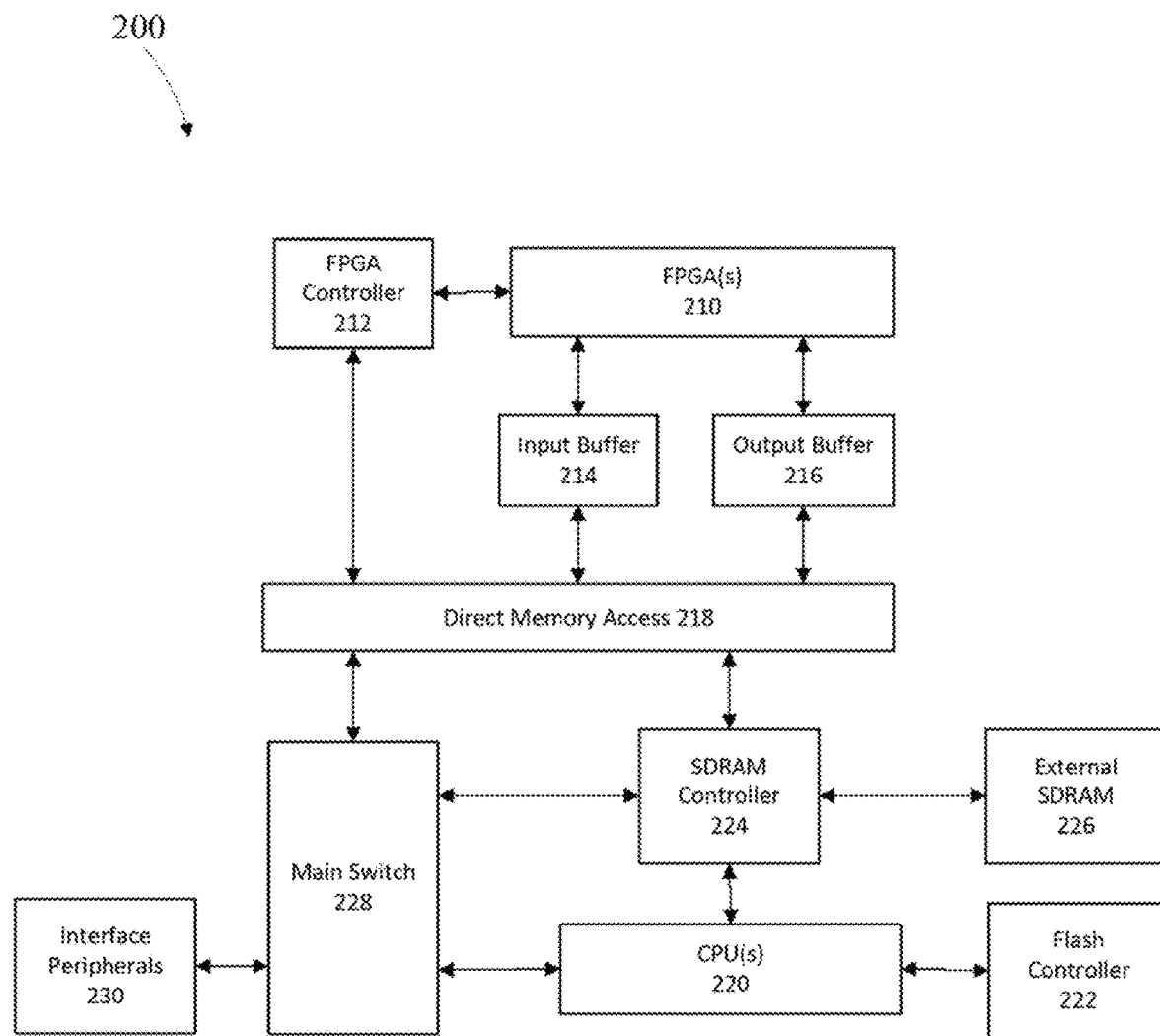
FIG. 2 is a second example system diagram in accordance with one embodiment of the disclosure.

FIG. 2 depicts a second example hybrid computational system 200 that may be used to implement neural nets associated with the operation of one or more portions or steps of process 500. In this example, the processors associated with the hybrid system comprise a field programmable gate array (FPGA) 210 and a central processing unit (CPU) 220.

The FPGA is electrically connected to an FPGA controller 212 which interfaces with a direct memory access (DMA) 218. The DMA is connected to input buffer 214 and output buffer 216, which are coupled to the FPGA to buffer data into and out of the FPGA respectively. The DMA 218 includes of two first in first out (FIFO) buffers one for the host CPU and the other for the FPGA, the DMA allows data to be written to and read from the appropriate buffer.

On the CPU side of the DMA are a main switch 228 which shuttles data and commands to the DMA. The DMA is also connected to an SDRAM controller 224 which allows data to be shuttled to and from the FPGA to the CPU 220, the SDRAM controller is also connected to external SDRAM 224 and the CPU 220. The main switch 228 is connected to the peripherals interface 230. A flash controller 222 controls persistent memory and is connected to the CPU 220.

Occupant monitoring systems (OMS) and driver monitoring systems (DMS) detect and process the actions of occupants as well as interactions between occupants such as talking to, arguing with, or fighting with another occupant. An example embodiment inputs a video sequence and directly outputs final results. The final results may include the location of occupants, and a human readable description of the occupants' behavior, as well as a scene summarization.

An example embodiment utilizes deep learning visual information recorded from camera in a video sequence to generate a high level feature representation from an in-cabin scene. Extracted temporal features may be further processed through a recurrent neural network, such as long-short-term memory (LSTM), or gated recurrent units (GRUs), to create a description of an in-cabin scene. The generated description can be further utilized for occupant interactions analysis, and determining a safety level and generating a safety alarm.

An example embodiment may apply a light weight convolutional 3D net to directly extract features from densely consecutive frames of video sequences, to extract and summarize spatial information, context information, and temporal information. The example embodiment may retain spatial information during a forward pass by utilizing convolutional gated recurrent units (GRUs) to process temporal features. This may allow action and interaction descriptions for occupants detected within the video sequence.

The example embodiment differs from current methods in that occupant behavior extraction may be based on a deep learning neural network to generate description of an in-cabin video sequence in close to real-time. The example method forgoes the veneration of an intermediate result and extracts features from a video sequence (live stream) recorded by a camera mounted inside the vehicle as input and outputs final results. The final results may include the location of occupants and a human readable description of the occupants' behavior.

The example embodiment may utilize alternative architectures to extract temporal feature information from short video clip, and or use alternative recurrent networks, such as convolutional long-short-term memory (LSTM) and the like, to process the temporal information. Additionally the method may also generate action or interaction labels for occupants detected within the video sequence.

In one example method a recurrent architecture, convolutional gated recurrent unit block, extracts convolutional 3D features directly and a ground truth encodes spatial information, time interval of actions, and a corresponding event description of occupants within the video sequence.

Figure 3:
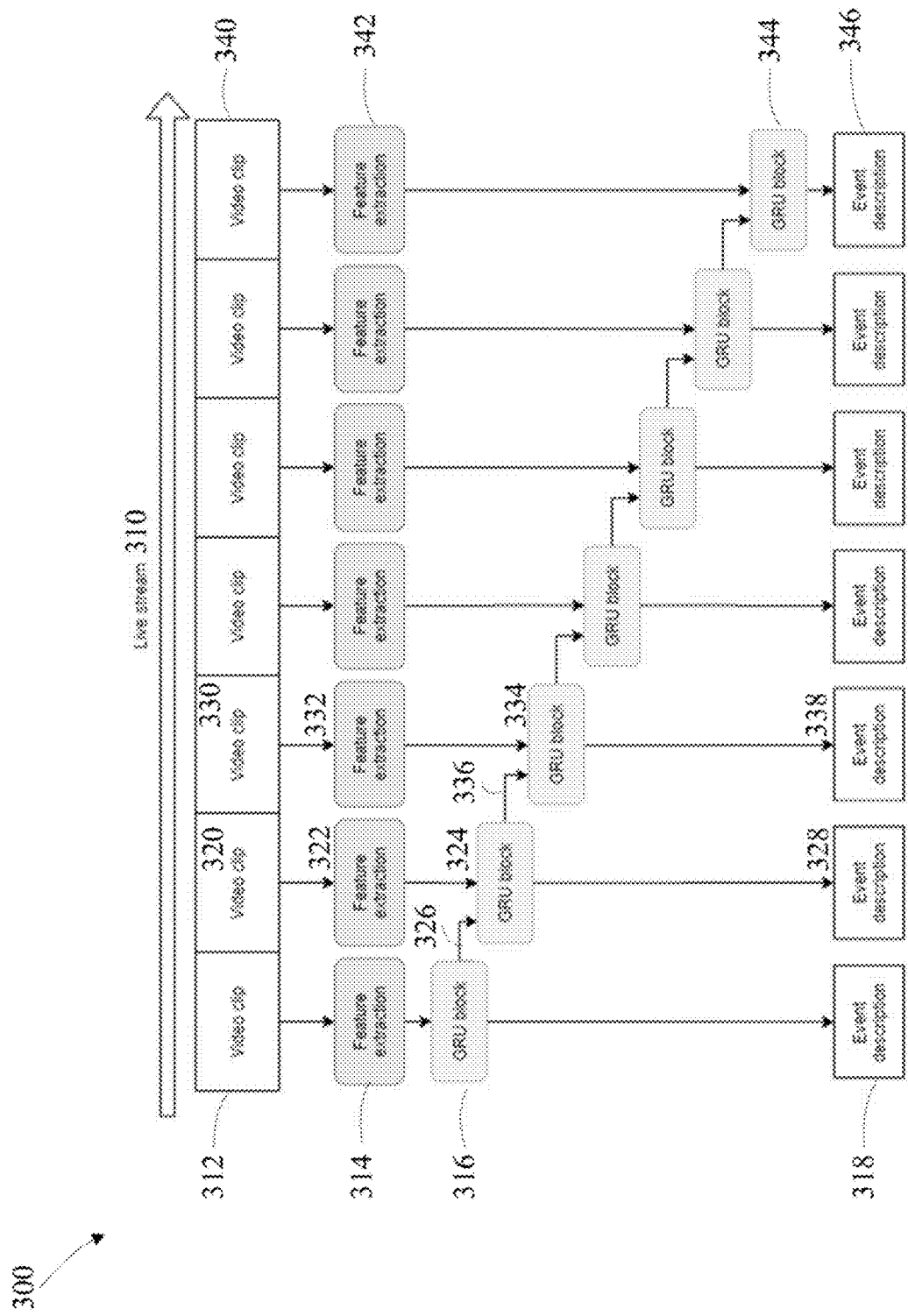
FIG. 3 is an example schematic diagram of the workflow in accordance with one embodiment of the disclosure.

FIG. 3 depicts an example schematic of the framework 300. In this example a live stream 300 video sequence is broken into video clips 312, 320, 330 and 340. For illustration purposes video clip 312 will be discussed in greater detail. Feature extraction 314 is performed on video clip 312, a convolutional gated recurrent unit (GRU) 316 processes the temporal features of video clip 312 and an event description 318 is output from an event descriptor. Additionally a second output 326 of GRU block 316 is sent to GRU block 324 for the next video clip 320 undergoing feature extraction 322. The output of GRU block 324 is sent to an event descriptor 328 and to the next GRU block 334 which is extracting the features 332 of video clip 330. At the end of the live stream 310 is video clip 340 undergoing feature extraction 342 having a GRU block 344 receiving input from the previous GRU block extracting features from the previous video clip and outputting extracted features to event descriptor 346.

The complexity of a 3D convolution may reduce the speed of the method; therefore, the 3D convolution may be replaced in one example embodiment with a 3D depth-wise and point-wise convolution within the feature extractor. This replacement may allow compression of the 3D convolutional neural network while preserving its accuracy.

Figure 4:
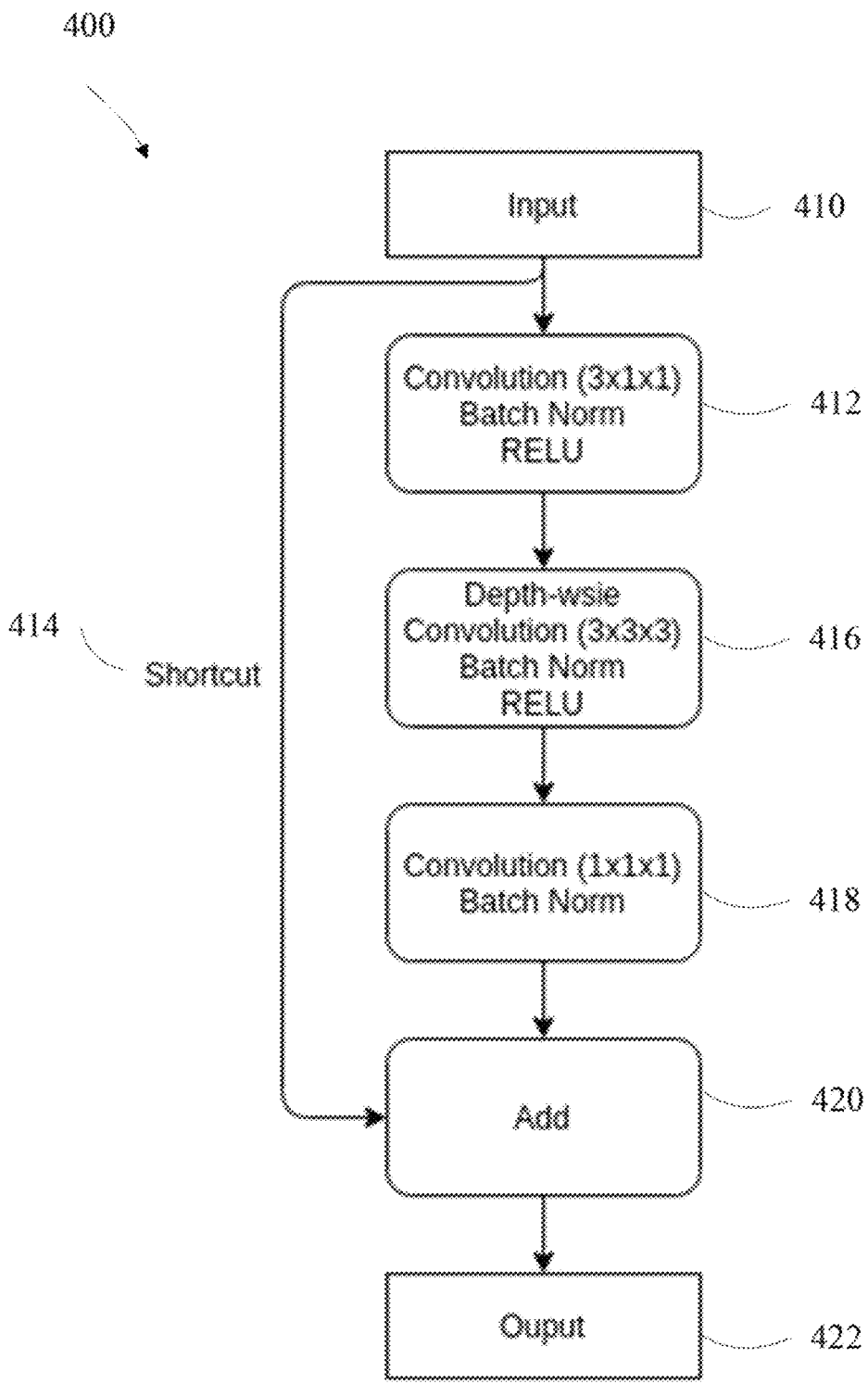
FIG. 4 is an example 3D bottleneck residual block in accordance with one embodiment of the disclosure.

FIG. 4 depicts an example 3D bottleneck residual block 400. In this example residual block an input 410 is input into a (3×1×1) convolutional batch normalization rectified linear unit 412 (ReLU) which is routed to a (3×3×3) depth-wise convolutional batch normalization rectified linear unit 416 and is routed through a (1×1×1) point-wise convolutional batch normalization rectified linear unit 418. The output of shortcut 414 and the point-wise convolutional batch normalization rectified linear unit 418 are added 420 and outputted 422.

An example method utilizes a convolutional gated recurrent unit block, to replace the fully connected layer with a convolutional layer within the gated recurrent unit block. In the example, the method may generate a feature map from within the feature extractor. In this circumstance, pooling does not need to be used and spatial information may be preserved during a forward pass of recurrent neural network. This differs from current methods that squeeze the feature maps into 1D feature vectors before integrating them in the temporal domain.

The example embodiment recognizes and describes the behavior of occupants within the vehicle cabin. The description of an occupant may include the occupant's location within the current frame, the occupant's gender and age, the occupant's mood, such as happy, calm, angry and the like and an occupant's action, such as calling, sleeping, talking, arguing, and the like and the occupant's interaction with others. In an example embodiment, once a labeler localizes the time window of the event, ground truth labels may be generated with a description of the event.

FIG. 5 depicts an example method of describing a temporal event 500, including receiving 510 a video sequence of the temporal event, extracting 512 at least one physical characteristic of an at least one occupant within the video sequence, extracting 514 at least one action of the at least one occupant within the video sequence and extracting 516 at least one interaction of the at least one occupant with a secondary occupant within the video sequence. The method also includes determining 518 a safety level of the temporal event within a vehicle based on at least one of the at least one action and the at least one interaction and describing 520 the at least one physical characteristic of the at least one occupant and at least one of the at least one action and the at least one interaction of the at least one occupant.

The at least one physical characteristic of the at least one occupant may include a location, and or at least one of a gender and an age and or at least one emotional state. The at least one action of the at least one occupant may include at least one of calling, talking and arguing. The method may further include alarming if the safety level of the temporal event exceeds a predetermined safety threshold, generating at least one action label for the at least one action of the at least one occupant, generating at least one interaction label for the at least one action of the at least one occupant and generating a scene summary of the video sequence of the temporal event of the at least one occupant.

FIG. 6 depicts another example method of describing a temporal event 600, including receiving 610 a video sequence of the temporal event, extracting 612 at least one spatial characteristic of an at least one occupant within the video sequence, extracting 614 at least one temporal action of the at least one occupant within the video sequence and extracting 616 at least one temporal interaction of the at least one occupant with a secondary occupant within the video sequence. The method also includes determining 618 a safety level of the temporal event within a vehicle based on at least one of the at least one temporal action and the at least one temporal interaction of the at least one occupant and describing 620 the at least one spatial characteristic of the at least one occupant and at least one of the at least one temporal action and the at least one temporal interaction of the at least one occupant.

The spatial characteristic of the occupant may include a location, and or at least one of a gender and an age and or at least one emotional state. The action of the at least one occupant may include at least one of calling, talking and arguing. The method may further include alarming if the safety level of the temporal event exceeds a predetermined safety threshold, generating at least one action label for the action of the occupant, generating an interaction label for the action of the occupant and generating a scene summary of the video sequence of the temporal event of the occupant.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the system. Skilled artisans may implement the described functionality in varying ways for each particular application. Various components and blocks may be arranged differently (e.g., arranged in a different order, or partitioned in a different way) without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects may be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to configurations of the subject technology. A disclosure relating to an aspect may apply to configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to configurations of the subject technology. A disclosure relating to an embodiment may apply to embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to configurations of the subject technology. A disclosure relating to a configuration may apply to configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

Structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for". Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art may be able to design and incorporate any one of the variety of mechanisms suitable for accomplishing the above described functionalities.

It is to be understood that the disclosure teaches just one example of the illustrative embodiment and that many variations of the invention may easily be devised by those skilled in the art after reading this disclosure and that the scope of then present invention is to be determined by the following claims.

What is claimed is:

1. A method of describing a temporal event, comprising:
   receiving a live stream video sequence of the temporal event recorded by an in-cabin camera of a vehicle;
   dividing the video sequence into multiple video clips;
   extracting at least one physical characteristic of an at least one occupant within video clip;
   extracting at least one action of the at least one occupant within the video clip based on a previous action with a previous video clip;
   extracting at least one interaction of the at least one occupant with a secondary occupant within the video clip based on a previous action with a previous video clip;
   determining a safety level of the temporal event within a vehicle based on the at least one action and the at least one interaction;
   describing the at least one physical characteristic of the at least one occupant and the at least one action and the at least one interaction of the at least one occupant; and
   wherein the extracting at least one action and extracting at least one interaction is performed by a convolutional gated recurrent unit (GRU), wherein the output of the GRU of the previous video clip is sent to the GRU of the at least one video clip; wherein the GRU allows action and interaction description for occupants detected within the video sequence by retaining spatial information during a forward pass to process temporal features.

2. The method of claim 1 wherein the at least one physical characteristic of the at least one occupant includes a location.

3. The method of claim 1 wherein the at least one physical characteristic of the at least one occupant includes at least one of a gender and an age.

4. The method of claim 1 wherein the at least one physical characteristic of the at least one occupant includes at least one emotional state.

5. The method of claim 1 wherein the at least one action of the at least one occupant includes at least one of calling, talking and arguing.

6. The method of claim 1 further comprising alarming if the safety level of the temporal event exceeds a predetermined safety threshold.

7. The method of claim 1 further comprising generating at least one action label for the at least one action of the at least one occupant.

8. The method of claim 1 further comprising generating at least one interaction label for the at least one action of the at least one occupant.

9. The method of claim 1 further comprising generating a scene summary of the video sequence of the temporal event of the at least one occupant.

10. A method of describing a temporal event, comprising:
    receiving a live stream video sequence of the temporal event recorded by an in-cabin camera of a vehicle;
    dividing the video sequence into multiple video clips;
    extracting at least one spatial characteristic of an at least one occupant within the video clip based on a previous action with a previous video clip;
    extracting at least one temporal action of the at least one occupant within the video clip based on a previous action with a previous video clip;
    extracting at least one temporal interaction of the at least one occupant with a secondary occupant within video clip;
    determining a safety level of the temporal event within a vehicle based on the at least one temporal action and the at least one temporal interaction of the at least one occupant;
    describing the at least one spatial characteristic of the at least one occupant and the at least one temporal action and the at least one temporal interaction of the at least one occupant; and
    wherein the extracting at least one temporal action and extracting at least one temporal interaction is performed by a convolutional gated recurrent unit (GRU), wherein the output of the GRU of the previous video clip is sent to the GRU of the at least one video clip; wherein the GRU allows action and interaction description for occupants detected within the video sequence by retaining spatial information during a forward pass to process temporal features.

11. The method of claim 10 wherein the at least one spatial characteristic of the at least one occupant includes a location.

12. The method of claim 10 wherein the at least one spatial characteristic of the at least one occupant includes at least one of a gender and an age.

13. The method of claim 10 wherein the at least one spatial characteristic of the at least one occupant includes at least one emotional state.

14. The method of claim 10 wherein the at least one temporal action of the at least one occupant includes at least one of calling, talking and arguing.

15. The method of claim 10 further comprising alarming if the safety level of the temporal event exceeds a predetermined safety threshold.

16. The method of claim 10 further comprising generating at least one action label for the at least one temporal action of the at least one occupant.

17. The method of claim 10 further comprising generating at least one interaction label for the at least one temporal action of the at least one occupant.

18. The method of claim 10 further comprising generating a scene summary of the video sequence of the temporal event of the at least one occupant.

\* \* \* \* \*